Oct. 7, 1958 A. L. CROSBY ET AL 2,855,016

UNIVERSAL BENDER FOR WAFER STEMS

Filed April 18, 1955 3 Sheets-Sheet 1

INVENTORS
ALTON L. CROSBY
HENRY. W. ROEBER
BY
Michael Hertz
ATTORNEY

UNIVERSAL BENDER FOR WAFER STEMS

Filed April 18, 1955 3 Sheets-Sheet 2

INVENTORS
ALTON L. CROSBY
HENRY W. ROEBER
BY
Michael Hertz
ATTORNEY

Oct. 7, 1958 A. L. CROSBY ET AL 2,855,016

UNIVERSAL BENDER FOR WAFER STEMS

Filed April 18, 1955 3 Sheets-Sheet 3

INVENTORS
ALTON L. CROSBY
HENRY W. ROEBER
BY Michael Hertz,
ATTORNEY

United States Patent Office 2,855,016

Patented Oct. 7, 1958

2,855,016

UNIVERSAL BENDER FOR WAFER STEMS

Alton L. Crosby, Austin, and Henry W. Roeber, Emporium, Pa., assignors to Sylvania Electric Products Inc., a corporation of Massachusetts Application April 18, 1955, Serial No. 501,982

14 Claims. (Cl. 153—16)

This invention relates to wire bending mechanism, particularly adapted to the bending of wire leads which are embedded in glass wafer, such as are utilized in the manufacture of radio tubes.

In the manufacture of radio tubes it is desirable to provide the leads with various types of bends therein and various heights and angles to suit the requirements of the electrode ends of mounts which are attached to these leads. For different types of tubes having different positions of electrodes, different bends are employed to eliminate, as much as possible, the use of tabs and straps to interconnect the leads and the electrodes. The use of a tab or strap necessitates making two welded joints, one between the tab and the electrode and the other between the tab and the stem lead. With suitably bent stem leads, a direct connection between a stem lead and an electrode may be effected, thus reducing the number of welds required to one per stem.

In the past, very few bent lead type tubes had been manufactured because of the lack of proper equipment to bring about the varied bending operation required on the stem leads to adapt them to the particular electrode arrangement required. With the tool of this invention, however, varied bends may be placed in the stem leads with ease and a larger number of tubes with bent leads can be easily manufactured.

It is an object of the invention to provide a simple wire bending device. It is a further object of the invention to provide various adjustment means in the device which shall enable it to make bends of different size and shape. It is a still further object of the invention to provide a tool which, with a substitution of a few parts, shall be capable of forming still other types of bends. These and other objects will be made clearer by reading the following specification in conjunction with the accompanying drawings in which.

Figure 1:
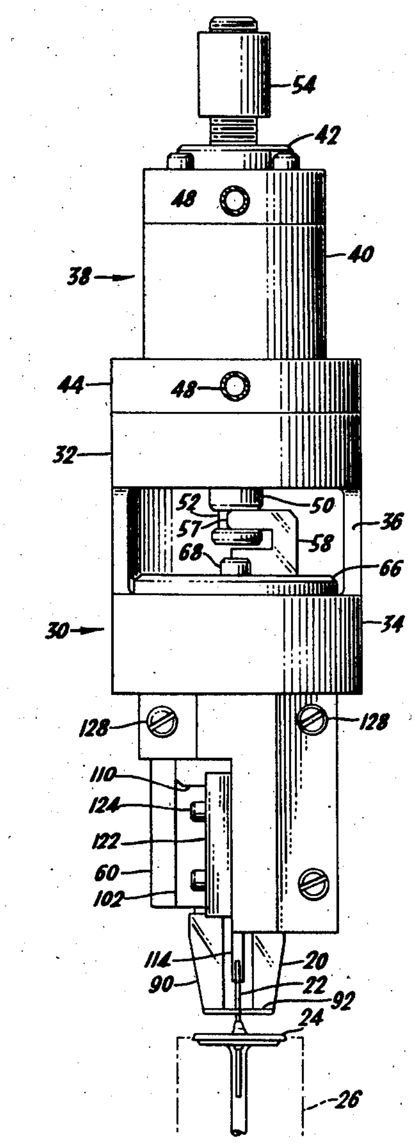
Fig. 1 is an elevational view of a form of wire bending tool.
Figure 2:
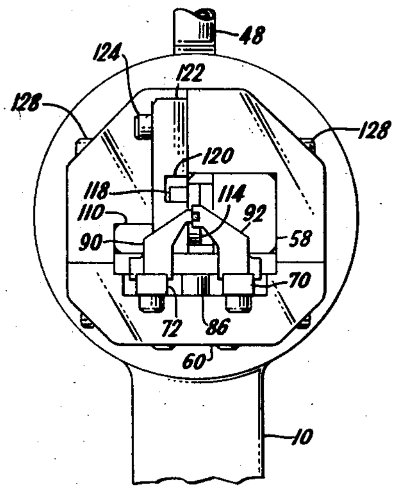
Fig. 2 is a bottom view of the wire bending tool showing a pair of clamp arms in engagement with a stem lead.

Referring to the drawings in greater detail, at 10 there is indicated a tool support arm provided with elongated slots 12 through which pass bolts 14. These bolts also traverse a slot 16 in a bracket 18 which bracket is vertically adjustable on a fixed portion of the machine, and the bolts are drawn up to fix the tool in place with its clamp jaws 20 in position to engage a selected stem lead 22 on a ceramic wafer 24 held in a fixed support 26 as will be described in greater detail later on. The bracket 18 is vertically adjustable to cause the jaws 20 to engage the stem lead 22 at a desired height.

The arm 10 is integral with a body 30 having two sleeves 32 and 34 united by connecting arcuate web 36. The sleeve 32 serves to mount a reciprocatable fluid motor 38 while the sleeve 34 serves to support, in an adjustable manner, the stem lead or wire engaging portions of the wire bender.

The motor comprises a cylinder 40 with heads 42, 44 and a reciprocatable piston 46 in the cylinder; suitable piping 48 is provided to direct the flow of fluid to opposite faces of the piston. A piston rod 50 of the motor passes through both heads. At the end of the rod between the head 44 and the sleeve 34 there is formed a circular groove 52 and at the other end of the rod there is provided a stop collar 54, engageable on one stroke of the piston with the head 42 and threadedly adjustable on the rod, the collar being furnished with clamping screws 56 engaging through a split portion of the collar so as to draw the same tight about the thread on the rod.

Figures 3, 4, 5:
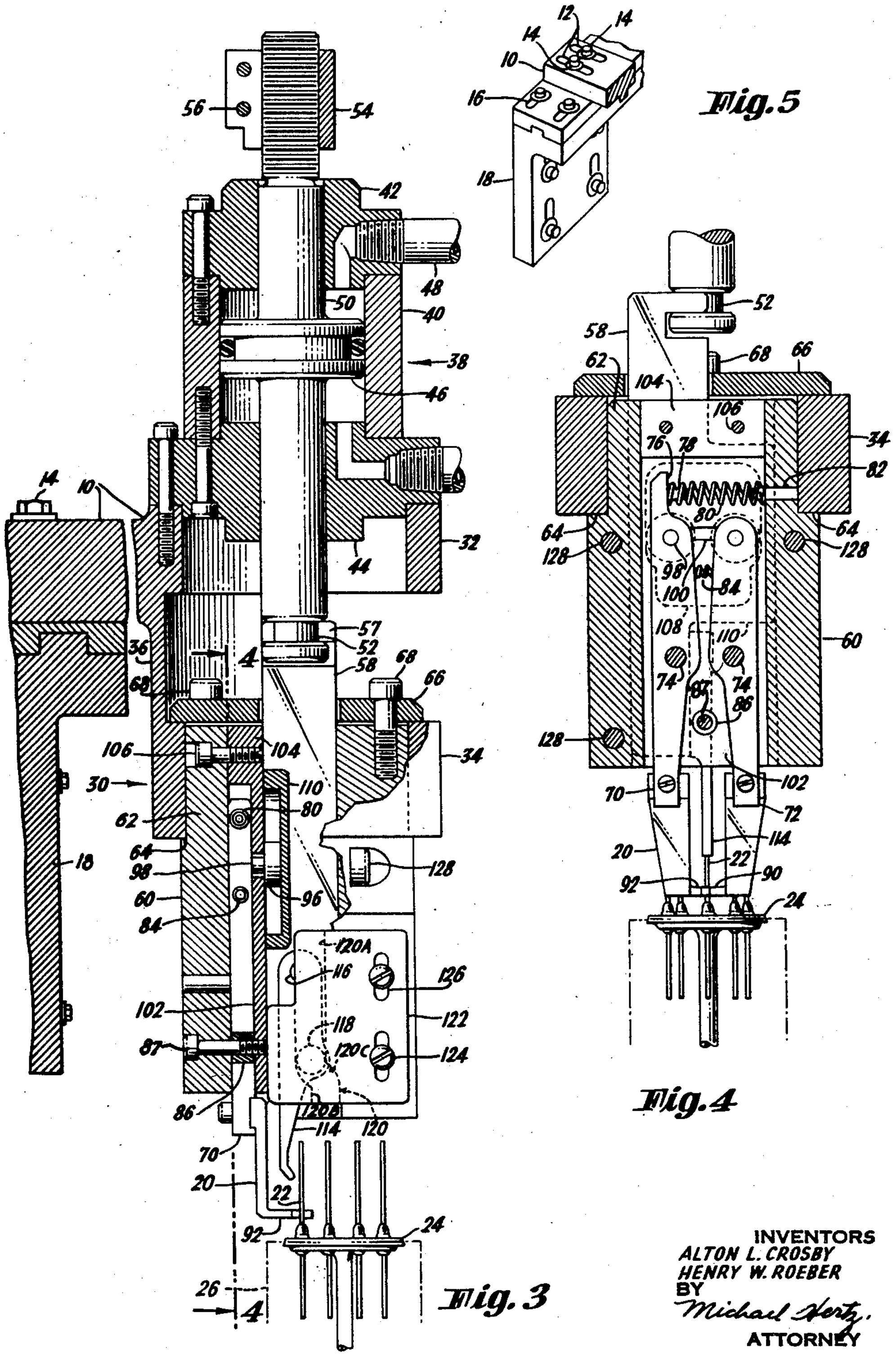
Fig. 3 is a view showing the interior construction of the tool, the view being for the major part a vertical central section through the tool shown in Fig. 1.
Fig. 4 is a sectional view of the wire bending end of the tool taken along the line 4—4 of Fig. 3.
Fig. 5 is a view showing means for mounting the tool on a fixed element of a machine, to provide flexibility in adjustment of the tool with reference to a wafer with stem leads.
Figure 7:
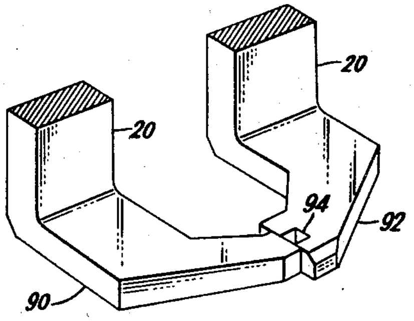
Fig. 7 is a perspective view of the ends of the arms employed in the bender of Figs. 1 to 4 and 6.

Engaging the rod 50 by means of its groove is the fork 57 of a cam bar 58, the bar being reciprocatable within a tool block 60 rotatably adjustable in the sleeve 34. For the purpose of providing this adjustment the block is provided with a neck portion 62 leaving a shoulder 64 engaged with the sleeve 34. Coacting with the block and sleeve is an annular disc 66. This disc bears against the sleeve 34 and is provided with cap screws 68 passing through the disc and threaded into the neck portion 62. By tightening the screws, the shoulder 64 and the disc 66 will be drawn against opposite faces of the sleeve thereby clamping the body 60 to the sleeve 34. The sleeve is initially positioned by proper adjustment of the bracket 18 and arm 10, so that the clamp jaws 20 are in proper position with respect to a stem lead 22. At this time the center of the sleeve is axially aligned with the same lead. By loosening the screws 68 and rotating the body 60, the clamp jaws may be rotated about the selected stem lead as an axis; the stem thruster, or finger, to be described, will then be operative to bend the lead in a desired direction. The clamping mechanism comprises a pair of levers 70, 72 (see Figs. 3 and 4), each pivoted intermediate its ends, as at 74, to a wall of the body 60. The lever 70 has an extension 76 provided with a pin 78 supporting a spring 80 whose other end surrounds a pin 82 mounted in the neck 62 of the body 60. The spring is compressed, thereby tending to force the opposite end of the lever 70 toward the lever 72. Between the two levers, however, is a second, slightly weaker, spring 84, whereby the springs 80 and 84 serve to move the other free ends of both levers toward each other. A centering spacer 86 on a screw 87 prevents excessive displacement of either lever. The jaws 20 are replaceably mounted on the free ends of the levers. As illustrated in Figs. 3 and 7, these jaws are L-shaped with arms 90 and 92 directed toward one another and both arms extending toward the center of the body 60. The arms are formed to engage and firmly hold a stem lead. Preferably the free end of arm 90 is plane while the free end of arm 92 is provided with a recess 94, the lead being held in the recess during the bending operation.

Each of the levers 70 and 72 is provided with a cam follower roller 96, each roller being mounted on a pin 98 freely movable in an arcuate slot 100 in a shield plate 102 held spaced from the body 60 by spacer 86 and screw 87 previously described and by a butt end 104 of the plate and screws 106.

Figure 10:
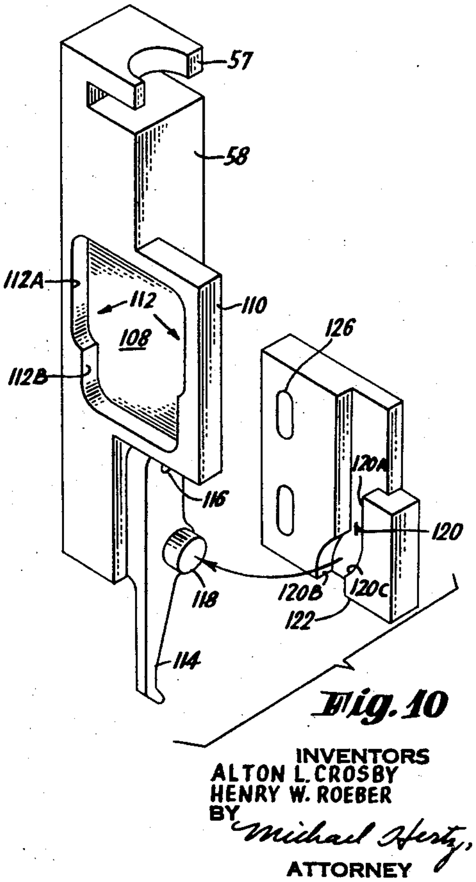
Fig. 10 is a detail view of mechanism employed to guide the movement of the wire thrusting finger.

To move the free ends of the clamp levers apart against the action of the springs 80 and 84, the cam bar 58 is provided with a gouged out recess 108, see Fig. 10, the recess extending into a protrusion 110 on the bar. The recess has cam walls 112 widely spread apart at the top portion of the walls, as indicated at 112A and narrower portions 112B at the bottom portions of the walls that, as the bar 58 rises, the rollers are forced toward each other thereby positively spreading the arms 90 and 92 to permit placing a stem lead between the arms.

Movable with the bar 58 is the bender finger 114, the finger being mounted on pivot pin 116 carried by the bar. On the finger is a stud 118 movable in a fixed cam track or cam way 120 in a block 122 adjustably fixed to the body 60 by screws 124 passing through slots 126 in the block and threaded into the body. The cam way 120 is comprised of two linear portions 120A and 120B offset from each other with a connecting way 120C therebetween so that as the finger 114 moves toward the arms 90, 92, the finger is pivoted outwardly away from the jaws 20 and toward the center of body 60. The slots 126 enable the timing of finger movement to be changed to vary the bend imparted to the wire lead, since the position of the offset in the cam track can be varied with respect to the stroke of the bar supporting the finger.

The body 60 is split longitudinally to admit assembly of parts, the parts being held together by machine screws as indicated at 128.

Figure 6:
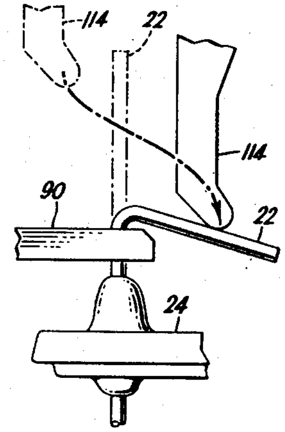
Fig. 6 illustrates how a bending of a stem lead is effected by operation of a wire thrusting finger using the form of clamp arms illustrated in Figs. 1 to 4.

It will be noted from Fig. 6 that the bending of a wire is effected by reason of the gripping action of the arms 90 and 92 and the stroke of finger 114. The height of the bend can be determined by adjustment of the bracket 18 on the main support frame; the particular lead wire selected can be determined by the adjustment of the arm 10 on the bracket 18 and the direction of bend of wire with respect to the wafer can be determined by rotation of the body 60 in the sleeve 34. The degree of bend of the wire can be varied by adjustment of block 122 on the body so as to vary the position of the offset portion of cam track 120 and by adjustment of collar 54 so as to limit the stroke of finger 114.

Figure 8:
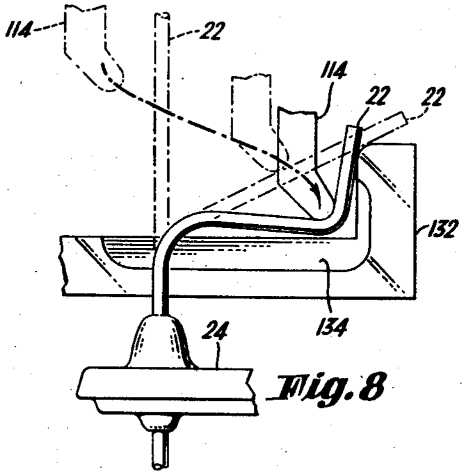
Fig. 8 illustrates how a different form of bend may be imparted to a stem lead by using a different pair of stem lead clamp arms, only one arm being illustrated.
Figure 9:
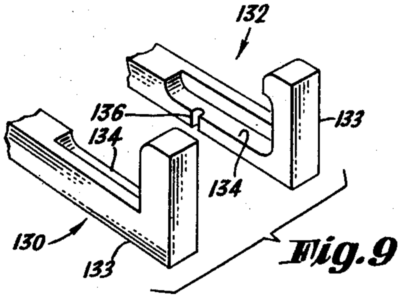
Fig. 9 is a perspective view of the ends of the modified arms.

If it be desired to impart to the wire a different form of bend than the simple bend already described, the jaws 20 may be exchanged for another pair of jaws having a desired shape. Thus if it be desired to impart to a lead wire a double bend as illustrated in Fig. 8, the jaws 20 would be replaced by other jaws of which the arms 130, 132, corresponding to arms 90 and 92, would partake of the form illustrated in Figs. 8 and 9. Each of the arms is provided with a leg portion 133 forming an L-shaped structure with angular recesses 134 along facing edges of the arms, so that on the operative stroke of finger 114 the stem lead would have a double bend imparted to it. The degree of bend could be varied by appropriate adjustment of parts as described above. Both of the arms may be provided with a wire positioning recess such as illustrated at 136 in Fig. 9, but one such recess has been found to be sufficient.

It should be understood that the tool, by suitable adjustment, is capable of making many desired forms of bends and that the specific embodiments herein disclosed are merely by way of example of the capabilities of the tool. The invention should be considered in the light of the claims appended hereto.

Having thus described the invention, what is claimed is:

1. A wire bender comprising a body, a pair of wire clamp supporting levers, pivots intermediate the length of said levers mounting the levers on said body, spring means on one side of said levers urging the levers apart at that end, a pair of wire clamp jaws on the opposite ends of said levers, a reciprocatable bar movable in said body, cam means on said bar operative in one portion of the travel of said bar to move the said first lever ends against the action of the spring means to open the wire clamp jaws and operative in another portion of the travel of the bar to release the first lever ends to the action of spring means to close the jaws on a wire, a wire bending finger pivotally mounted on the bar, a cam follower on the finger and a cam on the body cooperative with the follower to cause the finger to move in a path across the longitudinal axis of a wire held by the jaws, as the finger moves with the bar along the length of the wire.

2. A wire bender comprising an elongated body, a pair of wire clamp jaws supported by said body for movement to engage a wire, means for so moving the jaws, a bar reciprocatable in said body and having means thereon to control said jaw movement, a wire bending finger movably carried by said bar, a follower on said finger, a block having a camway comprised of two linear portions offset from each other with a connecting way therebetween, said camway being cooperative with the follower to cause the finger to move away from the jaws and therefore in a path across the longitudinal axis of a wire held by the jaws as the finger moves with the bar along the length of the body and wire, and means to enable adjustment of the block in the direction of the linear portions to vary the bending effect of the finger.

3. A wire bender comprising a tool support arm, a sleeve integral with said arm, a tool body rotatably adjustably held in said sleeve, a pair of wire clamping elements movably mounted on said body with wire clamping arms extending inwardly toward the center of the body, means for moving the arms toward each other, reciprocatable means mounted in said body for controlling the movement of the clamping elements and a wire bending finger carried by the reciprocatable means and guided toward the center of the body as the means reciprocates.

4. A wire bender comprising a tool support, a pair of spaced registering sleeves on said support, a motor having a reciprocatable piston rod supported by one of said sleeves, a tool bending unit having a reciprocatable bar supported by the other sleeve, the rod and bar being aligned and joined to one another, a pair of movable clamp jaws in said unit, means for moving the jaws toward each other, means movable with the bar to control the movement of the clamp jaws, a wire bending finger movable with the bar, means to pivot the finger during its movement with the bar and to a degree dependent upon bar displacement, and a stop collar adjustable on the piston rod engageable with a fixed part of the motor to limit the movement of the bar and therethrough the pivoting of the finger.

5. A wire bender comprising a body, a pair of wire clamp jaws supported by said body for movement to engage a wire, levers mounted in said body supporting said jaws, a bar reciprocatable in said body and having means thereon to control said jaw movement, spring means in said body acting on said levers to urge the jaws together, a wire bending finger movably carried by said bar, a block having a camway comprised of two linear portions offset from each other with a connecting way therebetween, said camway being cooperative with the follower to cause the finger to move in a path across the longitudinal axis of a wire held by the clamp as the finger moves with the bar along the length of the wire, and means to enable adjustment of the block in the direction of the linear portions to vary the bending effect of the finger.

6. A wire bender comprising a body, a pair of movable wire clamp jaws carried by said body, each jaw having an arm which engages and extends across the longitudinal axis of the wire and an additional leg spaced from the point of contact of the arm with the wire extending in the general direction of the longitudinal axis of the wire, levers mounted in said body supporting said jaws, a bar reciprocatable in said body and having means thereon to control the movement of the clamp jaws, spring means in said body acting on said levers to urge the jaws together, a wire bending finger movably carried by said bar, and means to shift the finger with relation to the bar on reciprocating movement of the bar to cause the finger to bend the wire by cooperation with the arms and legs of the clamp jaw.

7. A wire bender comprising a body, a pair of movable wire clamp jaws carried by said body, each jaw having an arm which engages and extends across the longitudinal axis of the wire and an additional leg spaced from the point of contact of the arm with the wire extending in the general direction of the longitudinal axis of the wire, recesses in the arms and legs merging into each other, levers mounted in said body supporting said jaws, a bar reciprocatable in said body and having means thereon to control the movement of the clamp jaws, spring means in said body acting on said levers to urge the jaws together, a wire bending finger movably carried by said bar, and means to shift the finger with relation to the bar on reciprocating movement of the bar to cause the finger to bend the wire by cooperation with the arms and legs of the clamp jaws.

8. A wire bender comprising a tool support arm, a sleeve integral with said arm, a tool body rotatably adjustably held in said sleeve, a pair of wire clamping elements movably mounted on said body with wire clamping arms extending inwardly toward the center of the body, levers mounted in said body supporting said elements, reciprocatable means mounted in said body for controlling the movement of the clamping elements, spring means in said body acting on said levers to urge the elements together, and a wire bending finger carried by the reciprocatable means and guided toward the center of the body as the means reciprocates.

9. A wire bender comprising a body, a pair of wire clamp jaws supported by said body for movement to engage a wire, levers mounted in said body supporting said jaws, a bar reciprocatable in said body and having means thereon to control said jaw movement, spring means in said body acting on said levers to urge the jaws together, a wire bending finger movably carried by said bar, means cooperating between the body and finger to move the finger relative to the bar to a degree dependent on bar displacement and means to provide for variations in the length of movement of said bar to thereby vary the wire bending effect of said finger.

10. A wire bender comprising an elongated body, a pair of movable wire clamp jaws carried by said body and means for moving the same toward each other, each jaw having a leg extending in the general direction of and spaced away from the longitudinal axis of the body and an arm extending toward said axis, a bar reciprocatable in said body and having means thereon to control the movement of the clamp jaws, a wire bending finger movably carried by said bar, and means to shift the finger toward the long axis of the body on reciprocating movement of the bar to cause the finger to bend the wire by cooperation with the arms and legs of the clamp jaws.

11. A wire bender comprising a body, a pair of wire clamp jaws supported by said body for movement toward each other to hold a wire, means for so moving the jaws, a bar reciprocatable in said body and having means thereon to control said jaw movement, a finger movably carried by said bar, and cooperating with the jaws to bend a wire while so held by said jaws and cooperative means on the body and finger for moving the finger relative to the bar to a degree dependent on bar displacement and means to adjustably limit the movement of said bar to thereby vary the wire bending effect of said finger.

12. A wire bender comprising a body, a pair of wire clamps each pivotally supported by said body for movement with respect to the body in order to engage a wire of a number of parallel wires on a fixed wafer, operating arms connected to said clamps, spring means within the body having a portion thereof carried by said arms and reacting against said body to effect the aforesaid movement, a bar reciprocatable in said body and having means engaging both said arms to separate the clamps, a wire bending finger movably carried by said bar, fixed means on the body, means on the finger to engage said fixed means to shift the finger with relation to the bar on reciprocating movement of the bar, an arm supporting the body, a fixed support, a bracket, means intermediate the bracket and arm to enable the arm to move universally in a plane perpendicular to bar movement, and means adjustably mounting the bracket on the support in a direction parallel to bar movement, all whereby a selected wire of the group of parallel wires may be engaged by the clamps and bent by finger movement at a desired elevation on the wire.

13. A wire bender comprising a body, a pair of wire clamps each pivotally supported by said body for movement with respect to the body in order to engage a wire of a number of parallel wires on a fixed wafer, operating arms connected to said clamps, spring means within the body having a portion thereof carried by said arms and reacting against said body to effect the aforesaid movement, a bar reciprocatable in said body and having means engaging both said arms to separate the clamps, a wire bending finger movably carried by said bar, fixed means on the body, means on the finger to engage said fixed means to shift the finger with relation to the bar on reciprocating movement of the bar, an arm supporting the body, said body being rotatably adjustable in said arm, a fixed support, a bracket, means intermediate the bracket and arm to enable the arm to move universally in a plane perpendicular to bar movement, and means adjustably mounting the bracket on the support in a direction parallel to bar movement, all whereby a wire of the group of parallel wires may be engaged by the clamps and bent by finger movement at a desired elevation on the wire and in a selected direction.

14. A wire bender comprising a body, a pair of wire clamps each pivotally supported by said body for movement with respect to the body in order to engage a wire, operating arms connected to said clamps, spring means within the body having a portion thereof carried by said arms and reacting against said body to effect the aforesaid movement, a bar reciprocatable in said body and having means engaging both said arms to separate the clamps, a wire bending finger movably carried by said bar, fixed means on the body, and means on the finger to engage said fixed means to shift the finger with relation to the bar on reciprocating movement of the bar.

References Cited in the file of this patent

UNITED STATES PATENTS

| | | |
|---|---|---|
| 227,634 | Loehner | May 18, 1880 |
| 808,672 | Mobley | Jan. 2, 1906 |
| 1,206,449 | Linquist | Nov. 28, 1916 |
| 1,430,323 | Reynolds | Sept. 26, 1922 |
| 1,448,567 | Muller | Mar. 13, 1923 |
| 1,720,133 | Le Roy | July 9, 1929 |
| 1,778,559 | Kondakjian | Oct. 14, 1930 |
| 1,950,039 | Smith | Mar. 6, 1934 |
| 2,154,524 | Nelson | Apr. 18, 1939 |
| 2,711,791 | Bechard et al. | June 28, 1955 |
| 2,732,744 | Kuchman et al. | Jan. 31, 1956 |